United States Patent
McClellan (12)

(10) Patent No.: US 10,105,999 B2
(45) Date of Patent: Oct. 23, 2018

(54) SYSTEM AND METHOD FOR TIRE RIMS CONFIGURED TO RECEIVE GRAVITY-BASED DEVICES

(71) Applicant: INTELLIAIRE, LLC, Park City, UT (US)

(72) Inventor: Scott McClellan, Park City, UT (US)

(73) Assignee: INTELLIAIRE, LLC, Park City, UT (US)

(*) Notice: Subject to any disclaimer, the term of this patent is extended or adjusted under 35 U.S.C. 154(b) by 0 days.

(21) Appl. No.: 15/210,732

(22) Filed: Jul. 14, 2016

(65) Prior Publication Data
US 2017/0015157 A1     Jan. 19, 2017

Related U.S. Application Data

(60) Provisional application No. 62/192,337, filed on Jul. 14, 2015.

(51) Int. Cl.
| | |
|---|---|
| *B60C 23/12* | (2006.01) |
| *B60C 23/00* | (2006.01) |
| *H02K 7/18* | (2006.01) |
| *H02K 15/14* | (2006.01) |
| *B60B 21/12* | (2006.01) |
| *H02K 7/06* | (2006.01) |
| *B60C 23/04* | (2006.01) |

(Continued)

(52) U.S. Cl.
CPC .............. *B60C 23/12* (2013.01); *B60B 21/12* (2013.01); *B60C 23/003* (2013.01); *B60C 23/0408* (2013.01); *H02K 7/06* (2013.01); *H02K 7/1846* (2013.01); *H02K 7/1876* (2013.01); *H02K 15/14* (2013.01); *B60C 23/06* (2013.01); *B60C 29/02* (2013.01)

(58) Field of Classification Search
CPC ... B60C 23/12; B60C 23/0408; B60C 23/003; B60C 29/02; B60C 23/06; H02K 7/1846; H02K 7/06; H02K 15/14; H02K 7/1876; B60B 21/12
USPC .......................... 152/415, 417, 418, 419, 427
See application file for complete search history.

(56) References Cited

U.S. PATENT DOCUMENTS

| | | | | |
|---|---|---|---|---|
| 2,512,766 | A | * 6/1950 | Caldwell | ................. B60C 23/12 137/226 |
| 2,719,560 | A | * 10/1955 | Caldwell | ................. B60C 23/12 152/419 |

(Continued)

FOREIGN PATENT DOCUMENTS

| | | |
|---|---|---|
| EP | 0855294 A2 | 7/1998 |
| WO | 2010141638 A1 | 12/2010 |

*Primary Examiner* — S. Joseph Morano
*Assistant Examiner* — Jean W Charleston (57) ABSTRACT

Systems and methods for accommodating gravity based devices within wheel rims. An exemplary method includes identifying a number of the gravity based devices to be contained within the wheel, identifying a type of each of the gravity based devices to be contained within the wheel, identifying, based on the type and the number of the gravity based devices, a location where each of the gravity based devices are to be installed within the wheel (i.e., the air hole locations), and generating holes in the rim, where the number of the holes equals the number of the gravity based devices, and where for each air hole location in the air hole locations a single hole in the holes is generated.

7 Claims, 5 Drawing Sheets

(51) Int. Cl.
*B60C 23/06* (2006.01)
*B60C 29/02* (2006.01)

(56) References Cited

U.S. PATENT DOCUMENTS

| | | | | |
|---|---|---|---|---|
| 3,538,777 A | * | 11/1970 | Bender | E21B 43/127 |
| | | | | 74/37 |
| 4,651,792 A | * | 3/1987 | Taylor | B60C 23/12 |
| | | | | 141/198 |
| 5,409,049 A | | 4/1995 | Renier | |
| 2006/0283534 A1 | * | 12/2006 | Hawes | B60C 23/12 |
| | | | | 152/415 |
| 2008/0066533 A1 | | 3/2008 | Beverly et al. | |
| 2008/0156406 A1 | * | 7/2008 | Breed | B60C 23/041 |
| | | | | 152/415 |

* cited by examiner

SYSTEM AND METHOD FOR TIRE RIMS CONFIGURED TO RECEIVE GRAVITY-BASED DEVICES

PRIORITY INFORMATION

The present application claims priority to U.S. provisional patent application 62/192,337, filed Jul. 14, 2015, the content of which is incorporated herein by reference in its entirety.

BACKGROUND

1. Technical Field

The present disclosure relates to automatic pumps and generators for tires and more specifically tire rim and air stem configurations and modifications for pumps which use changes in orientation due to tire rotation and gravitational force to drive pumps to automatically inflate tires.

2. Introduction

Tires are a critical part of modern transportation. However, proper tire inflation is an important factor in the safety, efficiency and cost of using tires. Neither underinflation nor overinflation is an optimal condition for tire longevity or safety. Overinflation can lead to unsafe wear patterns, lower traction and increased potential for a catastrophic failure or blowout of the tire during otherwise normal operation. Underinflation lowers the fuel efficiency of tires, increases wear, lowers the tire sidewall (lateral) stiffness making the tire less safe and increases the potential for catastrophic failure or blowout of the tire during otherwise normal operation. All rubber-based, modern tires lose some amount of gas due to the natural porosity of rubber. These porosity losses can be minimized by using larger air molecules (Nitrogen) than air. However, the porosity losses are only reduced, not eliminated.

Temperature can also affect tire inflation. Under higher temperatures, the tire pressure increases, while under lower temperatures, the tire pressure decreases. One solution is for users to manually check tire inflation periodically, but this is a difficult task, requires training, and consumes significant user time. Further, some portion of the user population will never check their tire inflation due to inconvenience, regardless of the benefits that proper inflation provide. Tire inflation is a problem that many drivers do not care enough about to invest the time to check or correct until the problem is so bad that the tire, and consequently the vehicle, become undrivable, or unsafe. An automatic approach to tire inflation that does not require end-users, i.e. the drivers of these vehicles, to spend time and effort would be significantly preferable.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Gravity-driven devices, such as air pumps and electricity generators, can be mounted to a tire rim, and are activated to pump air or generate electricity by exploiting gravity at various orientations as the tire rotates. To accommodate the gravity-driven devices, modifications to the rim and/or tire-stem can be required.

For example, to accommodate gravity based devices within an existing rim can require identifying a number of the gravity based devices to be contained within the wheel, identifying a type of each of the gravity based devices to be contained within the wheel, identifying, based on the type and the number of the gravity based devices, a location where each of the gravity based devices are to be installed within the wheel (i.e., the air hole locations), and generating holes in the rim, where the number of the holes equals the number of the gravity based devices, and where for each air hole location in the air hole locations a single hole in the holes is generated.

Similarly, the use of gravity based devices can require a different tire-stem system, where one stem is for air to manually inflate the tire and a second is for the gravity-based device. A system having multiple stems could, for example, have a tire rim with an outer surface onto which an inflatable tire can be installed, where the tire rim has: a first hole for an inflation stem; and a second hole for fixedly attaching a pump, wherein the pump is configured to pump air into the inflatable tire via rotational motion of the tire rim about an axis, the rotational motion causing gravity to move a pump element of the pump in a first direction at a first rotational position, to yield a first pump stroke, and causes gravity to move the pump element in a second direction at a second rotational position, to yield a second pump stroke, wherein the first pump stroke and the second pump stroke pump a gas into the inflatable tire through the second hole. The system can also have a mounting channel in the tire rim into which the pump can be inserted and attached, such that the pump, when inserted, is flush with the outer surface of the tire rim.

In yet another example, the wheel/rim can accommodate gravity based devices by using a single tire stem or valve. Such accommodation can be accomplished by identifying a number of the gravity based devices to be contained within the wheel, identifying a type of each of the gravity based devices to be contained within the wheel, identifying, based on the type and the number of the gravity based devices, locations where each of the gravity based devices are to be installed within the wheel, attaching the gravity based devices to the wheel, wherein each gravity based device in the gravity based devices is respectively attached at a respective location of the locations, and connecting the gravity based devices with hoses and valves such that the gravity based devices receive air from outside the wheel via a single inflation stem.

DETAILED DESCRIPTION

A system, method and computer-readable media are disclosed for gravity-driven pumps, as well as various supporting concepts, mechanisms, and approaches. It should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

Given that the present disclosure utilizes gravity as a mechanism for automatically pumping a tire, we begin with a brief discussion of the properties of gravity. Gravity has a property of an ever-present acceleration and is related to the size and density of a planet or large body generating the gravity. On earth, the gravitational acceleration is about 9.8 m/s$^2$ or 32.2 ft/s$^2$. The gravitational potential energy (U) is related to the product of the mass, gravitational acceleration and height above the surface that the mass is raised according to the equation:

$$U=mgh$$

where:

U is gravitational potential energy, m is mass, g is the surface value of gravity, and h is the height above the surface (for surface calculations and small distances above the surface of the gravity generating body).

The more general, integral form of defining gravity is as follows:

$$U(r) = -\int_{\infty}^{r} \frac{-GMm}{r'^2} dr' = -\frac{GMm}{r}$$

where:

U(r) is the gravitational potential energy as a function of the distance between the bodies;

G is the gravitational constant;

M is the Mass of the attracting body;

m is the mass of the body gravity is acting upon; and r is the distance between their centers.

Harnessing gravity or gravitational energy to perform useful work is not new: hydroelectric dams, siphons, mass pulley systems, are a few examples. In this application, we use gravity to move a mass within a chamber, which moves air from one chamber to another (in this case, moving air into a tire.). By changing the orientation of the chamber, we use gravity to create the pump stroke and intake stroke. As the tire rotates around an axle, the magnitude of the gravitational vector component varies for a given tangent on the circumference of the tire. While gravity is always pulling 'down', the force relative to a fixed tangent on the tire changes. The tangents on a circle, at 12:00 and 6:00 are parallel to each other and are horizontal in a normal, earth reference frame. The gravitational vector component is perpendicular to the tangents at 12:00 and 6:00 or pointing vertically down. In our application, at 12:00 and 6:00, gravity cannot do any constructive work due to the fact that the gravitational vector is perpendicular to the orientation of our pumping mechanism. However, the tangents on a circle at 3:00 and 9:00 are parallel with each other and are parallel with the gravitational vector. At the 3:00 and 9:00 orientations, in this application, one can utilize the full effect of gravity (the gravitational potential energy) to do constructive work. Gravity-driven pumps exploit changes in their orientation to utilize the gravitational force vector's vertical component to do work. The work can be driving a pump, or generating electrical power to drive an electric pump or other electrical components such as sensors, wireless communication devices, computing devices, or other components. A gravity-driven pump is different from an automatic pump that operates using centrifugal force due to rotation of a tire. Centrifugal force applies to virtually any rotating mass, whereas a gravity-driven pump would work when the rotational direction would cause some change in orientation of the pumping device, utilizing gravitational force to pull a pumping element in opposite directions at different rotational positions. Automatic, gravity-driven pumps can be used to inflate tires to offset the natural gas leakage of modern tires, and/or can maintain tire pressure and inflation within a designed and desired range. In one aspect, the mass can be used both to drive a pump and to generate electricity for various devices.

Figure 1:
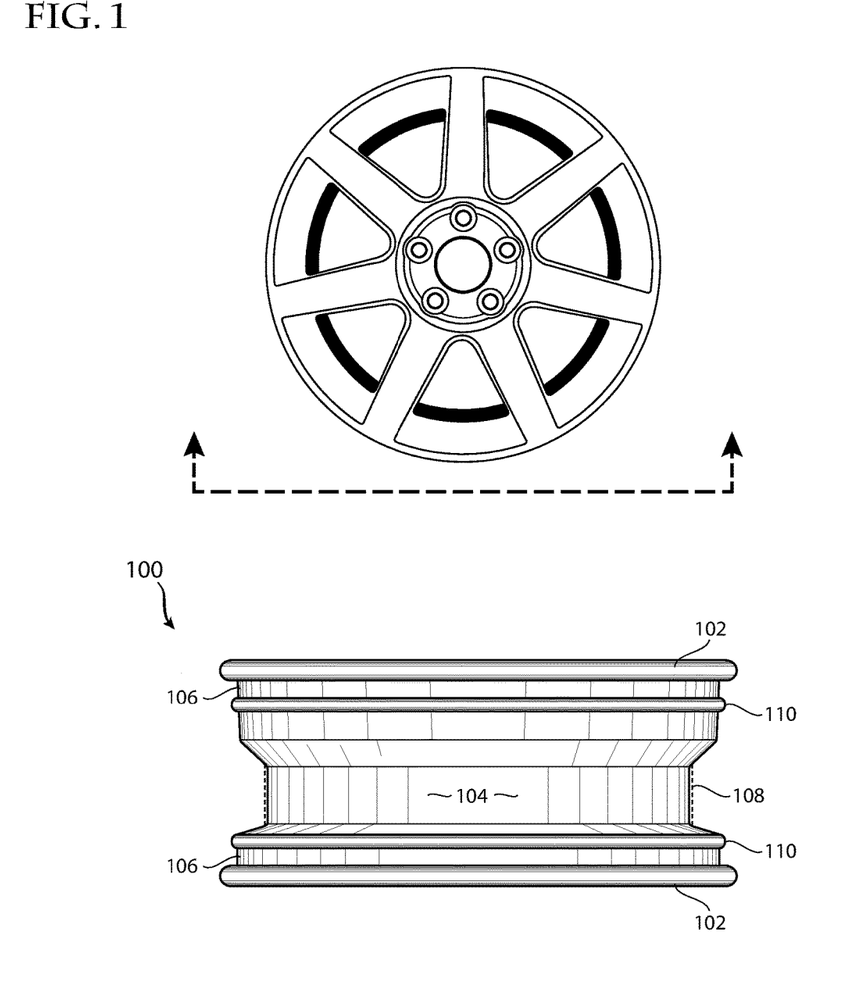
FIG. 1 illustrates an example of a wheel rim.

FIG. 1 illustrates an example of a wheel rim 100. The wheel rim includes a wheel disc 102 and an annular portion or ring 104 defining a rim width 108. Between the wheel disc 102 and the annular portion 104, beads 110 extend in a substantially radial direction along a respective circumference (separated from the wheel disk by a space 106). The beads 110 define a drop well from the wheel discs 102 to the annular portion 104, allowing coupling of the wheel rim 100 to a tire.

Figure 2:
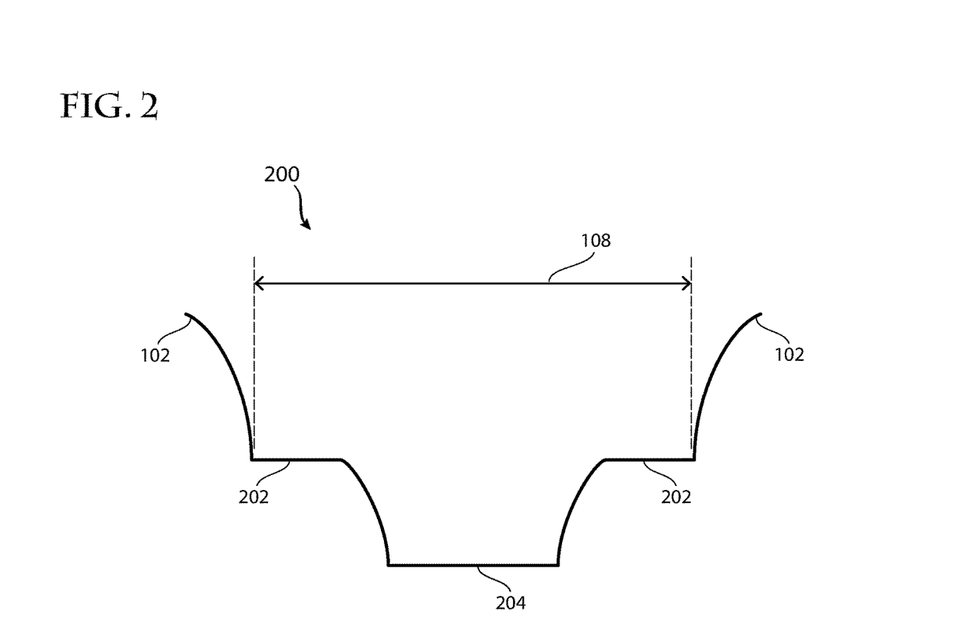
FIG. 2 illustrates a side perspective of a portion of a wheel rim.

FIG. 2 illustrates a side perspective 200 of a wheel rim. In this example, the wheel rim 200 defines a multi-step drop well between the wheel discs 102, the wheel rim having a rim width 108. The first step/drop 202 corresponds to the rim diameter of the wheel rim 200, with a second, deeper well 204.

Figure 3:
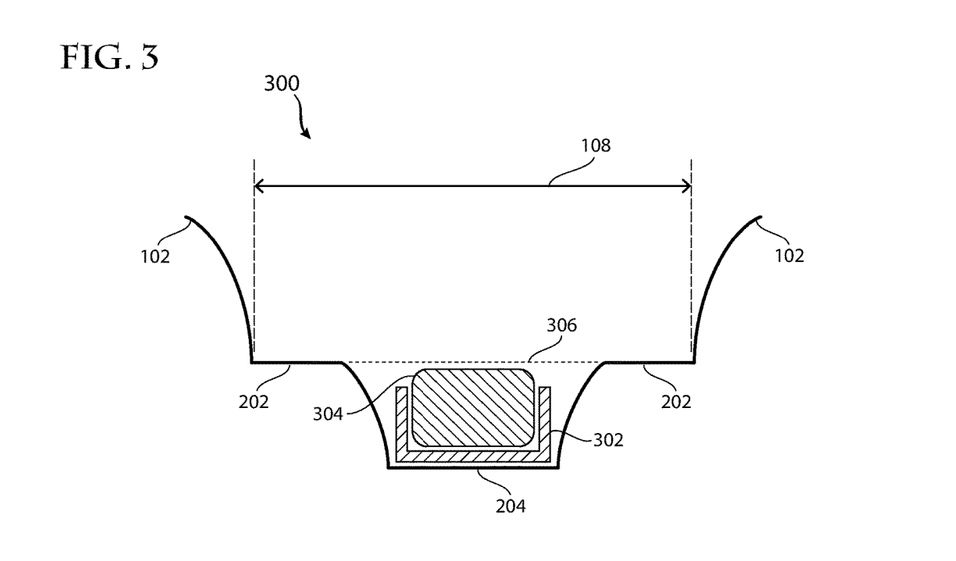
FIG. 3 illustrates the side perspective of the wheel rim with a gravity-based device and a mounting bracket for a gravity-based device.

FIG. 3 illustrates the side perspective 300 of the wheel rim with a gravity-based device 304 and a mounting bracket 302 for the gravity-based device 304. Because the gravity based device requires a combination of wheel movement and gravity to move pumps/generators/etc., the gravity based devices must be located at a fixed location within the wheel.

The gravity based device 304 will be fixed in place to either the tire or the wheel rim. In FIG. 3, the mounting bracket 302 is fixed to the lowest/deepest wheel well 204 of the wheel rim. The gravity-based device 304 is then locked into place within the mounting bracket 302 such that as the wheel turns, the gravity-based device remains in place and the pumps/generators can perform as designed. The gravity based device 304 is below a line 306 corresponding to the "middle-tier" 202 of the multi-layered wheel well.

The gravity based devices can require the use of air from outside the wheel (i.e., outside the sealed, inner environment of the tire and wheel rim). Specifically, pumps will always require access to air from outside the wheel, whereas gravity-based electrical generators can utilize air from outside the wheel or can produce electricity within a sealed environment (i.e, no outside air is needed for the generation of electricity). In certain cases, the gravity-based device can pump air and, when no air is required, generate electricity. Consider the following examples.

In a first example, the gravity-based device is a pump designed to fill or maintain air pressure within a tire. Because the tire will be sealed to the wheel rim, the gravity-based device will need to obtain air from outside the wheel rim/tire, and therefore relies on an air inflation stem or other mechanism for allowing air into the tire without allowing air to escape into the atmosphere. The inflation stem can be specific to the gravity-based device or can share use of a tire's standard inflation stem.

In a second example, the gravity-based device is a pump designed to fill or maintain air pressure within a tire and, when no additional air is needed within the tire, uses the pump mechanism to produce electricity. In such an example, the gravity-based device can use an inflation stem while pumping, then continue to access air while generating electricity (though not "pumping" the air into the tire). Alternatively, the gravity-based device can access the inflation stem while pumping, then cease accessing the inflation stem during generation of electricity.

In a third example, the gravity-based device is a generator of electricity using a coil and ferrous material which, as the wheel turns, passes through the coil and generates electricity. In such an example, no access to an inflation stem may be needed.

Figure 4:
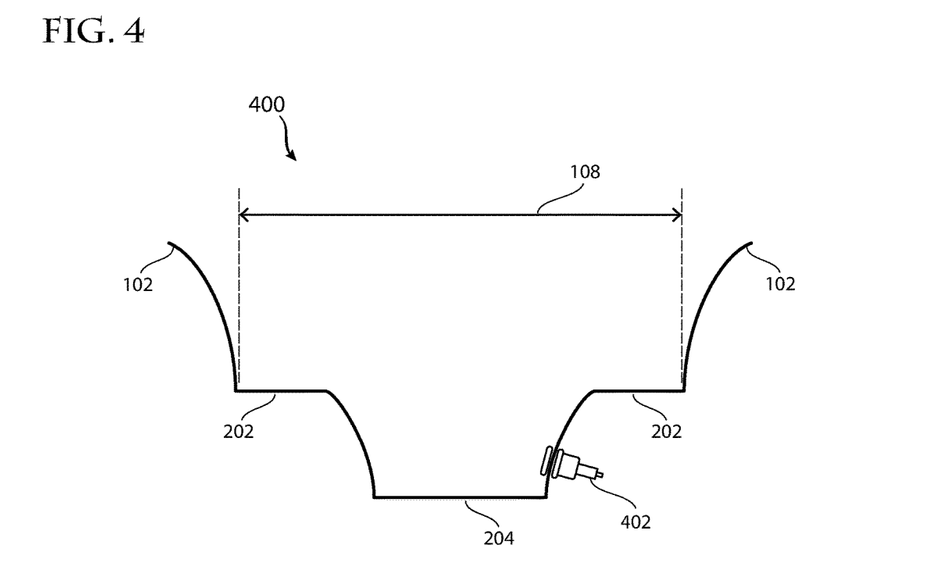
FIG. 4 illustrates an example of a wheel having a tire stem.

FIG. 4 illustrates an example of a wheel 400 having an inflation stem 402 for inflating a tire, using the same side perspective of the wheel rim illustrated in FIGS. 2 and 3. FIG. 4 is intended to show an exemplary inflation stem 402 for a "normal" wheel, with no gravity-based device installed, where the inflation stem 402 is used solely for the inflation/deflation of the tire.

Figure 5:
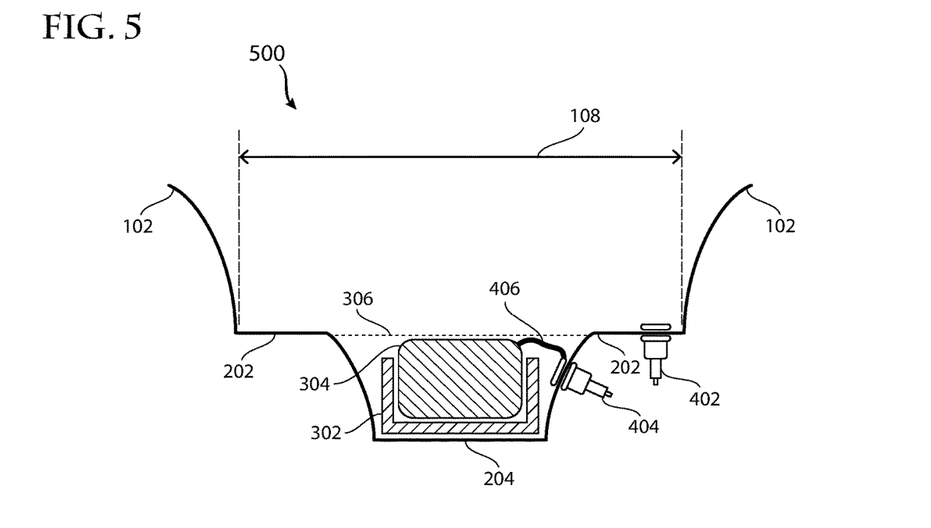
FIG. 5 illustrates an example of a wheel having multiple tire stems for tire inflation and the gravity-based device.

FIG. 5 illustrates an example of a wheel 500 having multiple tire stems 402, 404 for tire inflation and the gravity-based device. In this example, the gravity-based device 304 has an inflation stem 404 which is used exclusively by the gravity-based device 304, the gravity-based device 304 being connected to the inflation stem 404 via a hose 406, tube, or other mechanism. As the wheel turns, the gravity-based device 304 pumps air from the inflation stem 404 and into the tire according to configurations, setting, and fill requirements. A second inflation stem 402 can be used for manual inflation by a user of the tire.

Figure 6:
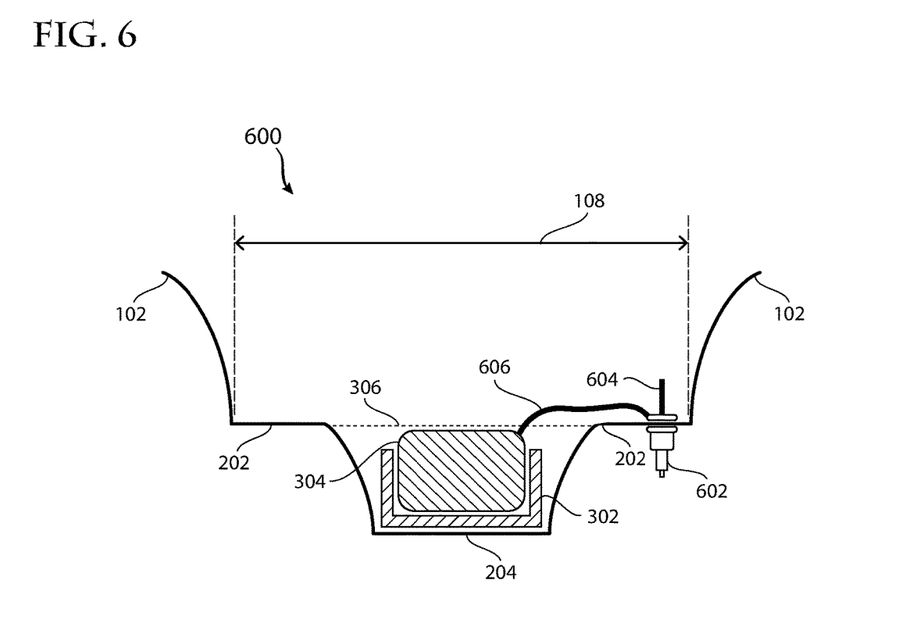
FIG. 6 illustrates use of a single tire stem for both tire inflation and the gravity based device.

FIG. 6 illustrates an example of a wheel 600 having a single tire stem for both tire inflation and the gravity based device. In this example 600, the gravity based device 304 uses air from a multi-use inflation stem 602 which can also be used for manual inflation 604. The gravity-based device 304 can connect to the multi-use inflation stem 602 via a tube 606, hose, or other mechanism. In such a configuration, the multi-use inflation stem 602 uses valves to ensure that air is only flowing in the directions required. For example, during manual inflation, air should only be flowing from the multi-use inflation stem 602 into the tire via a manual inflation path 604, whereas during wheel movement no manual inflation will be occurring and therefore air should only be flowing from the multi-use inflation stem 602 to the gravity-based device 304. The multi-use inflation stem 602 can be a smart valve (i.e., using processors, computer-readable storage devices, integrated circuits, and/or specially configured circuits to determine where (or if) air should be flowing), and/or can be configured using mechanical components.

Where there are multiple gravity-based devices within a wheel, each separate gravity-based device can require a separate inflation stem, or the gravity based devices can share (using a tube, hose, or other mechanism) a single inflation stem. Thus in one configuration, only a single inflation stem is used for multiple gravity-based devices and/or the manual inflation, whereas in another configuration multiple gravity-based devices are each provided a separate inflation stem. In this second example, each inflation stem will have an "air hole" through the wheel rim into which the inflation stem is mounted.

If a rim is being modified to accommodate gravity-based devices, the location where each device will be fixed within the wheel, and the location of each hole for the inflation stems assigned to each device, must be determined. If a rim is being made "from scratch" to accommodate gravity based devices, the rim can be designed to have a number of holes based on the type of configuration intended to operate with the rim. Thus if a rim is being designed to operate with a single gravity-based device, the rim can have a single inflation stem (where manual inflation shares the stem with the gravity-based device) or two stems. If the rim is being designed to allow for additional gravity-based devices, additional holes and inflation stems can be introduced/formed.

Consider a system with a first hole for normal/manual inflation and a second hole for a gravity-based device. Such a system could be described as: a tire rim with an outer surface onto which an inflatable tire can be installed, wherein the tire rim has: a first hole for an inflation stem; and a second hole for fixedly attaching a pump, wherein the pump is configured to pump air into the inflatable tire via rotational motion of the tire rim about an axis, the rotational motion causing gravity to move a pump element of the pump in a first direction at a first rotational position, to yield a first pump stroke, and causes gravity to move the pump element in a second direction at a second rotational position, to yield a second pump stroke, wherein the first pump stroke and the second pump stroke pump a gas into the inflatable tire through the second hole; and a mounting channel in the tire rim into which the pump can be inserted and attached, such that the pump, when inserted, is flush with the outer surface of the tire rim. Such a system can further include an inflatable tire, and where the second hole is specific to a type of the pump. For example, if the pump has a certain volume or stroke rate, the hole may be uniquely configured for that pump.

Figure 7:
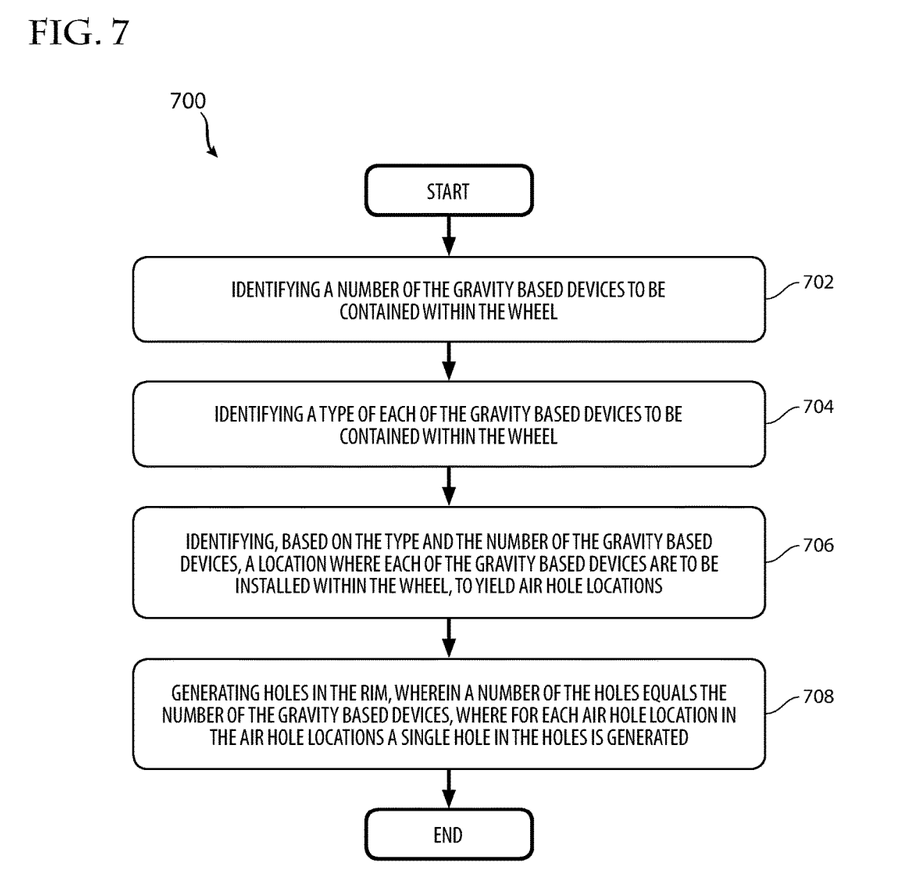
FIG. 7 illustrates an example method embodiment.

FIG. 7 illustrates an example method embodiment 700. A system or person practicing the method generates a rim of a wheel by: identifying a number of the gravity based devices to be contained within the wheel (702); identifying a type of each of the gravity based devices to be contained within the wheel (704); identifying, based on the type and the number of the gravity based devices, a location where each of the gravity based devices are to be installed within the wheel, to yield air hole locations (706); and generating holes in the rim, wherein a number of the holes equals the number of the gravity based devices, where for each air hole location in the air hole locations a single hole in the holes is generated (708).

Such a method can further involve attaching the gravity based devices to the wheel, where the gravity based devices receive air through the holes, and/or attaching a tire to the wheel such that the tire, under pressure, is sealed to the rim. The gravity based devices can be homogenous or can vary. For example, some of the gravity based devices can have a relatively short pump stroke, whereas others can have a relatively long pump stroke, and in a multiple gravity-based device system, the wheel could have one device which uses short strokes and a second device which uses long strokes. The gravity based devices can be, as described above, pumps which can inflate a tire attached to the wheel, can be electrical generators, or can be a mixture of both pumps and electrical generators. In certain configurations, the pump can change utility based on the specific needs and circumstances. The holes generated can be used by inflation stems/valves for the respective gravity-based devices, and such holes can be generated by at least one of punching and drilling.

An alternative method, where a single hole is used by multiple devices within a wheel, could read: identifying a number of the gravity based devices to be contained within the wheel; identifying a type of each of the gravity based devices to be contained within the wheel; identifying, based on the type and the number of the gravity based devices, locations where each of the gravity based devices are to be installed within the wheel; attaching the gravity based devices to the wheel, wherein each gravity based device in the gravity based devices is respectively attached at a respective location of the locations; and connecting the gravity based devices with hoses and valves such that the gravity based devices receive air from outside the wheel via a single inflation stem.

While specific implementations are described herein, it should be understood that this is done for illustration purposes only. Other components and configurations may be used without parting from the spirit and scope of the disclosure.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

I claim:

1. A system comprising:
   a tire rim with an outer surface onto which an inflatable tire can be installed, wherein the tire rim has:
   a first hole for an inflation stem; and
   a second hole for fixedly attaching a pump, wherein the pump is configured to pump air into the inflatable tire via rotational motion of the tire rim about an axis, the rotational motion causing gravity to move a pump element of the pump in a first direction at a first rotational position, to yield a first pump stroke, and causes gravity to move the pump element in a second direction at a second rotational position, to yield a second pump stroke, wherein the first pump stroke and the second pump stroke pump a gas into the inflatable tire through the second hole; and
   a mounting channel in the tire rim into which the pump can be inserted and attached, such that the pump, when inserted, is flush with the outer surface of the tire rim.

2. The system of claim 1, further comprising:
   the inflatable tire.

3. The system of claim 1, wherein the second hole is specific to a type of the pump.

4. The system of claim 1, wherein the tire rim has a third hole for fixedly attaching a second pump, wherein the second pump pumps air into the inflatable tire using a gravity initiated pump stroke.

5. The system of claim 4, wherein the pump and the second pump have distinct stroke lengths.

6. The system of claim 1, wherein the tire rim has a gravity-based electrical generated fixedly attached.

7. The system of claim 1, wherein the pump uses the first pump stroke and the second pump stroke to generate electricity when the gas is not pumped into the inflatable tire.

* * * * *